(12) United States Patent
Satani (10) Patent No.: US 7,077,474 B2
(45) Date of Patent: Jul. 18, 2006

(54) SEAT SYSTEM

(75) Inventor: Kenji Satani, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/866,857

(22) Filed: Jun. 14, 2004

(65) Prior Publication Data

US 2005/0012367 A1    Jan. 20, 2005

(30) Foreign Application Priority Data

Jul. 17, 2003   (JP)   ............................ 2003-276113

(51) Int. Cl.
*B60N 2/32*   (2006.01)

(52) U.S. Cl. ........................ 297/236; 297/112; 297/233

(58) Field of Classification Search ................ 297/232, 297/233, 238, 243, 248, 257, 112, 113, 114, 297/378.12, 236; 296/64, 69, 65.05

See application file for complete search history.

(56) References Cited

U.S. PATENT DOCUMENTS

| 808,679 | A | * | 1/1906 | Pickles | 297/236 |
| 1,898,448 | A | * | 2/1933 | Hultgren | 297/116 |
| 1,922,502 | A | * | 8/1933 | Scragg | 297/116 |
| 1,998,186 | A | * | 4/1935 | Caesar et al. | 297/116 |
| 2,035,451 | A | * | 3/1936 | Bell | 297/116 |
| 2,621,708 | A | * | 12/1952 | Luce, Jr. | 297/117 |
| 4,496,189 | A | * | 1/1985 | Tanizaki et al. | 297/63 |

FOREIGN PATENT DOCUMENTS

| BE | 530 269 A | 8/1957 |
| DE | 815 457 C | 10/1951 |
| DE | 916 624 C | 8/1954 |
| FR | 729 469 A | 7/1932 |
| FR | 1 215 479 A | 4/1960 |
| JP | 2001-047910 | 2/2001 |

* cited by examiner

*Primary Examiner*—Peter R. Brown
(74) *Attorney, Agent, or Firm*—Brooks Kushman P.C.

(57) ABSTRACT

An automobile 1 is provided with a second seat row 20. The second seat row 20 is constituted by a first independent side seat 21, a second independent side seat 22, and an auxiliary seat 23 including an auxiliary seat cushion 23b. A projection 24 is mounted to the left side of a left side sidewall frame member 21f located on the left side of the first independent side seat 21 to project leftward. The auxiliary seat cushion 23b has a leg 27 mounted to the bottom of the cushion body 23h.

6 Claims, 9 Drawing Sheets

SEAT SYSTEM

BACKGROUND OF THE INVENTION (1) Field of the Invention

The present invention relates to a vehicle seat system equipped with an auxiliary seat.

(2) Description of Related Art

Seat systems have conventionally been known which each comprise two independent seats spaced in the width direction of an automobile and an auxiliary seat arranged between the two independent seats when located in a seating position on which a passenger can be seated (see, for example, Japanese Unexamined Patent Publication No. 2001-47910).

In such a seat system, the seat cushion of the auxiliary seat is connected to one side of the seat cushion of one of the two independent seats. A leg for supporting the auxiliary seat in the seating position is attached to the underside of the seat cushion of the auxiliary seat. The leg extends to the floor when the auxiliary seat is located in the seating position.

However, when the leg is formed to reach the floor, the leg accordingly becomes long. Therefore, when the auxiliary seat is not used and is thus to be accommodated, the long leg prevents the auxiliary seat from being accommodated.

In order to remove this adverse effect, it is conceivable to remove the leg from the auxiliary seat. However, the provision of only the connection between the auxiliary seat and the independent seat may cause the auxiliary seat to move downward on the application of a large load to the auxiliary seat. Accordingly, any countermeasures must be taken to prevent the auxiliary seat from moving downward.

SUMMARY OF THE INVENTION

The present invention has been made in view of the foregoing points, and therefore its object is to provide, in a seat system equipped with an auxiliary seat, a technique for restricting the auxiliary seat cushion from moving downward, for example, on the application of a large load thereto, without the provision of a leg that reaches the floor.

According to a first aspect of the present invention, a seat system comprises: two independent seats each having a seat cushion and located at one side of the seat system and at the other side of the seat system, respectively so as to be spaced apart from each other in the lateral direction of the seats; and an auxiliary seat having an auxiliary seat cushion switchable between a use state where the auxiliary seat is located between the independent seats to allow a passenger to be seated thereon and a non-use state, the auxiliary seat cushion being supported at one side portion thereof by the seat cushion of one of the two independent seats located at the one side of the seat system, wherein the seat cushion of the other of the two independent seats located at the other side of the seat system has a restriction part for restricting the side portion opposite to the one side portion of the auxiliary seat cushion in the use state from being displaced downward.

Since the seat cushion of the other independent seat has a restriction part for restricting the other side portion of the auxiliary seat cushion in the use state from being displaced downward, the restriction part can restrict the auxiliary seat cushion from being displaced downward, for example, even on the application of a large load to the auxiliary seat cushion. Hence, the auxiliary seat cushion can be restricted from being displaced downward, for example, when a large load is applied to the auxiliary seat cushion, without providing a long leg that reaches the floor.

According to a second aspect of the present invention, in the seat system of the first aspect, the seat cushion of the other independent seat may have frame members at least on the right and left sides; a projection may be provided as the restriction part on one of the frame members located at the one side of the seat system so as to be located below the bottom of the auxiliary seat cushion in the use state and project toward the one side of the seat system; and a leg may be provided on the bottom of the auxiliary seat cushion so as to extend toward the top of the projection when the auxiliary seat cushion is in the use state.

Since the projection is provided as a restriction part on the one of the frame members constituting a part of the seat cushion of the other independent seat, the restriction part can be embodied utilizing the other independent seat.

The leg is provided on the bottom of the auxiliary seat cushion to extend toward the top of the projection when the auxiliary seat cushion is in the use position. More particularly, the leg of the auxiliary seat cushion in the use state extends toward the top of the projection and does not reach the floor. Therefore, the leg can be short.

According to a third aspect of the present invention, in the seat system of the second aspect, the top of the projection may be spaced a predetermined distance apart from the distal end of the leg of the auxiliary seat cushion in the use state.

Since the top of the projection is spaced a predetermined distance apart from the distal end of the leg of the auxiliary seat cushion in the use state, under normal conditions, the top of the projection does not make contact with the distal end of the leg. Hence, under normal conditions, noises can be prevented from being produced due to the contact of the top of the projection with the distal end of the leg.

Since the top of the projection is spaced a predetermined distance apart from the distal end of the leg of the auxiliary seat cushion in use, the leg can be short.

According to a fourth aspect of the present invention, in the seat system of the third aspect, the seating surface of the auxiliary seat cushion in the use state is located at the same level as the seating surfaces of the seat cushions of the independent seats, and the auxiliary seat cushion is thinner than the seat cushions of the independent seats.

Since the auxiliary seat cushion is thinner than the seat cushions of both the independent side seats, the auxiliary seat cushion can be made compact.

According to a fifth aspect of the present invention, in the seat system of the fourth aspect, the seat cushion of the one independent seat may comprise a cushion base in which an upwardly opened recess is formed and a cushion seating part covering the recess so as to be freely opened and closed; the one side portion of the auxiliary seat cushion may be rotatably connected to and supported by the cushion base to allow the auxiliary seat cushion in the non-use state to be accommodated in the recess with the bottom of the auxiliary seat cushion directed upward; and the distal end of the leg of the auxiliary seat cushion in the non-use state may be located lower than the bottom of the cushion seating part in the closed state.

As described above, the distal end of the leg of the auxiliary seat cushion in the non-use position is located lower than the bottom of the cushion seating part in the closed state. Therefore, when the auxiliary seat cushion is accommodated in the recess, the leg does not need to be folded. Hence, the structure of the leg and the structure of the auxiliary seat cushion can be simplified.

According to a sixth aspect of the present invention, in the seat system of the second aspect, the top of the projection may be tilted upward from the other side to the one side of the seat system.

Since the top of the projection is tilted upward from the other side to the one side of the seat system, this ensures that the projection restricts the auxiliary seat cushion from being displaced downward as compared with the case where the projection is tilted downward from the other side to the one side of the seat system.

Effects of the Invention

According to the present invention, since the seat cushion of the other independent seat has a restriction part for restricting the other side portion of the auxiliary seat cushion in the use state from being displaced downward, the restriction part can restrict the auxiliary seat cushion from being displaced downward, for example, even on the application of a large load to the auxiliary seat cushion. Hence, the auxiliary seat cushion can be restricted from being displaced downward, for example, when a large load is applied to the auxiliary seat cushion, without the provision of a long leg that reaches the floor.

Since the projection is provided as a restriction part on the one of the frame members constituting a part of the seat cushion of the other independent seat, the restriction part can be embodied utilizing the other independent seat.

The leg is provided on the bottom of the auxiliary seat cushion to extend toward the top of the projection when the auxiliary seat cushion is in the use position. More particularly, the leg of the auxiliary seat cushion in the use state extends toward the top of the projection and does not reach the floor. Therefore, the leg can be short. This does not cause the leg to interfere with the accommodation of the auxiliary seat cushion when the auxiliary seat cushion is accommodated in the non-use state.

Since the top of the projection is spaced a predetermined distance apart from the distal end of the leg of the auxiliary seat cushion in the use state, under normal conditions, the top of the projection does not make contact with the distal end of the leg. Hence, under normal conditions, noises can be prevented from being produced due to the contact of the top of the projection with the distal end of the leg.

Since the top of the projection is spaced a predetermined distance apart from the distal end of the leg of the auxiliary seat cushion in use, the leg can be short.

Since the auxiliary seat cushion is thinner than the seat cushions of both the independent seats, the auxiliary seat cushion can be made compact, leading to size reduction of space for accommodating the auxiliary seat cushion therein.

The distal end of the leg of the auxiliary seat cushion in the non-use position is located lower than the bottom of the cushion seating part in the closed state. Therefore, when the auxiliary seat cushion is accommodated in the recess, the leg does not need to be folded. Hence, the structure of the leg and the structure of the auxiliary seat cushion can be simplified.

Since the top of the projection is tilted upward from the other side to the one side of the seat system, this ensures that the projection restricts the auxiliary seat cushion from being displaced downward as compared with the case where the projection is tilted downward from the other side to the one side of the seat system.

Other features, aspects, and advantages of the present invention will become apparent from the following detailed description of the invention which refers to the accompanied drawings.

DETAILED DESCRIPTION OF THE INVENTION

An embodiment of the present invention will be described with reference to the drawings.

Figure 1:
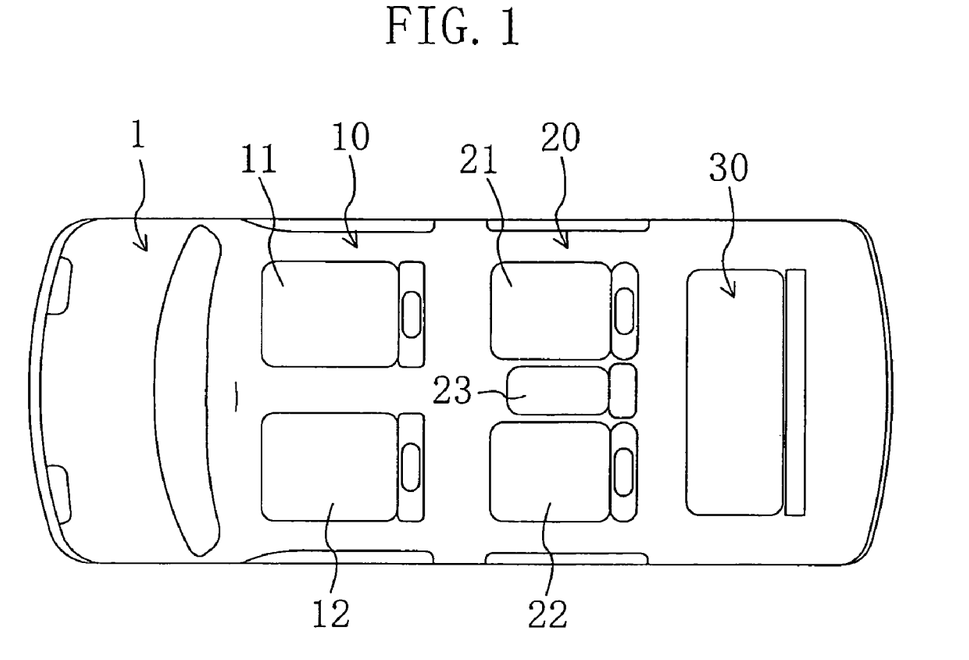
FIG. 1 is a plan view showing the layout of a seat row of a vehicle according to an embodiment of the present invention.

As shown in FIG. 1, an automobile 1 according to an embodiment of the present invention comprises a first seat row 10 placed in the front row of the automobile 1, a second seat row 20 placed behind the first seat row 10, and a third seat row 30 placed behind the second seat row 20. The first seat row 10 comprises a driver's seat 11 and a passenger's seat 12. The second seat row 20 comprises a first independent side seat 21 placed behind the driver's seat 11, a second independent side seat 22 placed behind the passenger's seat 12, and an auxiliary seat 23 that is used auxiliary. The third seat row 30 is composed of a bench seat on which two or three passengers can be seated.

The second seat row 20 characterizing the present invention will hereinafter be described in detail.

As shown in FIGS. 1 through 4, the first and second independent side seats 21 and 22 are spaced at a predetermined interval in the width direction of the automobile 1. In the other words, the first independent side seat 21 is located at one side of the second seat row 20, and the second independent side seat 22 is located at the other side of the second seat row 20, with a space left between both the seats 21 and 22. The space between the independent side seats 21 and 22 is utilized as a walk-through space. The first and second independent side seats 21 and 22 comprise seat cushions 21a and 22a and seat backs 21b and 22b, respectively. The seat backs 21b and 22b are mounted to the rear ends of the seat cushions 21a and 22a so that they can be folded down onto the tops of the seat cushions 21a and 22a, respectively. In this embodiment, the second independent side seat 22 refers to the one independent seat, and the first independent side seat 21 refers to the other independent seat. In this embodiment, the lateral direction of the seats 21 and 22 coincides with the width direction of the automobile 1.

The seat cushions 21a and 22a comprise storage parts 21d and 22d in which storage recesses 21c and 22c are formed to be open upward, cushion seating parts 21e and 22e covering the storage recesses 21c and 22c so as to be freely opened/closed, right and left plate-like sidewall frame members 21f and 21p and 22f and 22p extending in the length direction of the automobile 1, and right and left supporting members 21g, 21g and 22g, 22g for supporting the cushion seating parts 21e and 22e, respectively. The right and left sidewall frame members 21f and 21p and 22f and 22p, storage parts 21d and 22d and the like constitute a cushion base positioned below the cushion seating parts 21e and 22e, respectively. The storage parts 21d and 22d are formed of resin. The cushion seating parts 21e and 22e comprise frames 21h and 22h and cushion materials 21i and 22i provided on the frames 21h and 22h, respectively.

The right and left supporting members 21g, 21g and 22g, 22g are fixed at one ends (the upper ends in FIG. 2) to the front portions of the frames 21h and 22h via plate-like members 21j and 22j extending in the width direction of the automobile 1. The other ends (the lower ends in FIG. 2) of the right and left supporting members 21g, 21g and 22g, 22g can rotate about axes extending in the width direction of the automobile 1, respectively. This can move the cushion seating part 21e or 22e to the open position where the cushion seating part 21e or 22e is opened or the closed position where the cushion seating part 21e or 22e is closed. When the cushion seating parts 21e and 22e are located in the open positions, the storage recesses 21c and 22c are exposed. On the other hand, when the cushion seating parts 21e and 22e are located in the closed positions, the storage recesses 21c and 22c are covered with the cushion seating parts 21e and 22e, respectively. The cushion seating parts 21e and 22e are substantially vertical to the floor of the automobile 1 when located in the open positions. Furthermore, in order to keep the cushion seating parts 21e and 22e in the open positions, i.e., in order to prevent the cushion seating parts 21e and 22e in the open position from rotating forward, pipes 21k and 22k for use as stoppers are provided at the front ends of the independent side seats 21 and 22 to extend in the width direction of the automobile 1.

Figure 2:
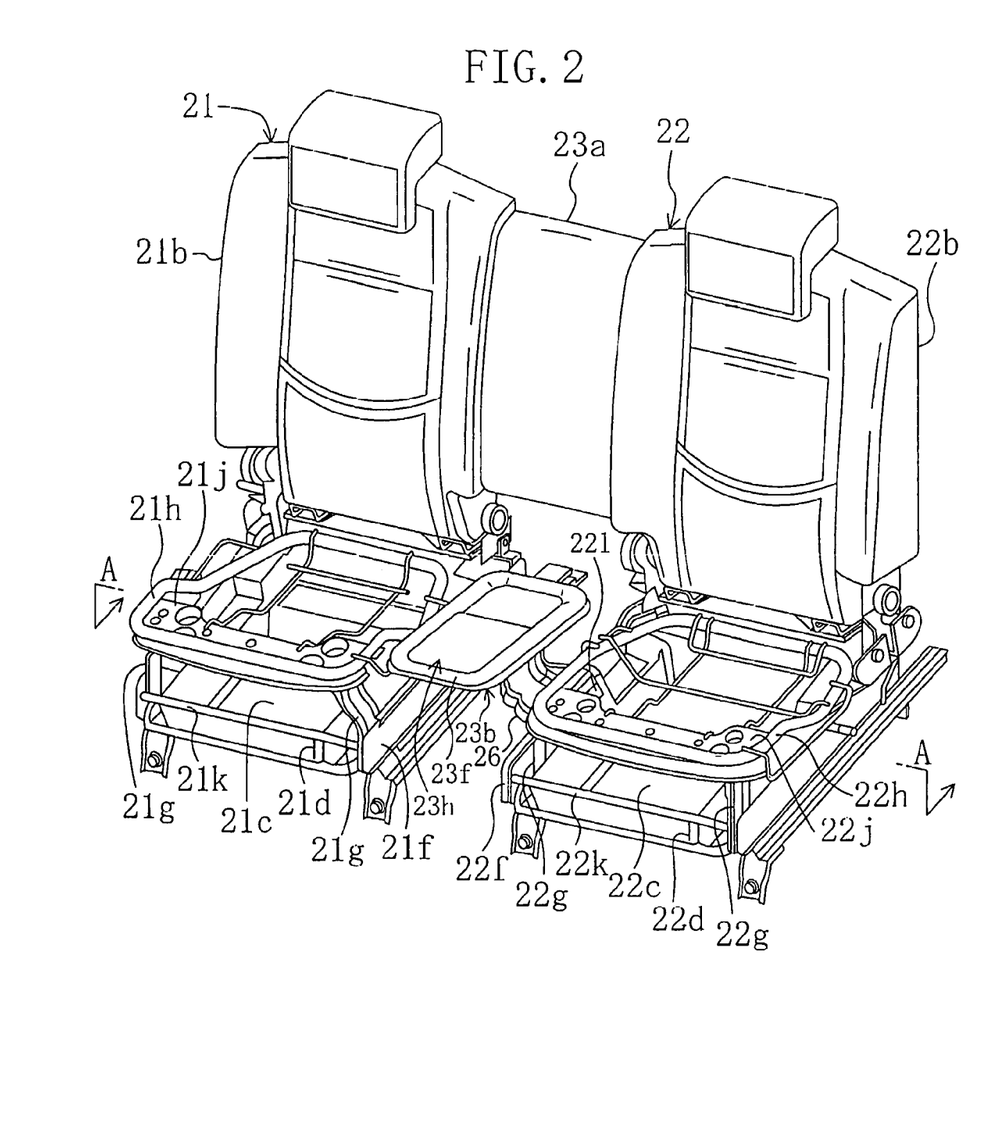
FIG. 2 is a perspective view of a second seat row.
Figure 3:
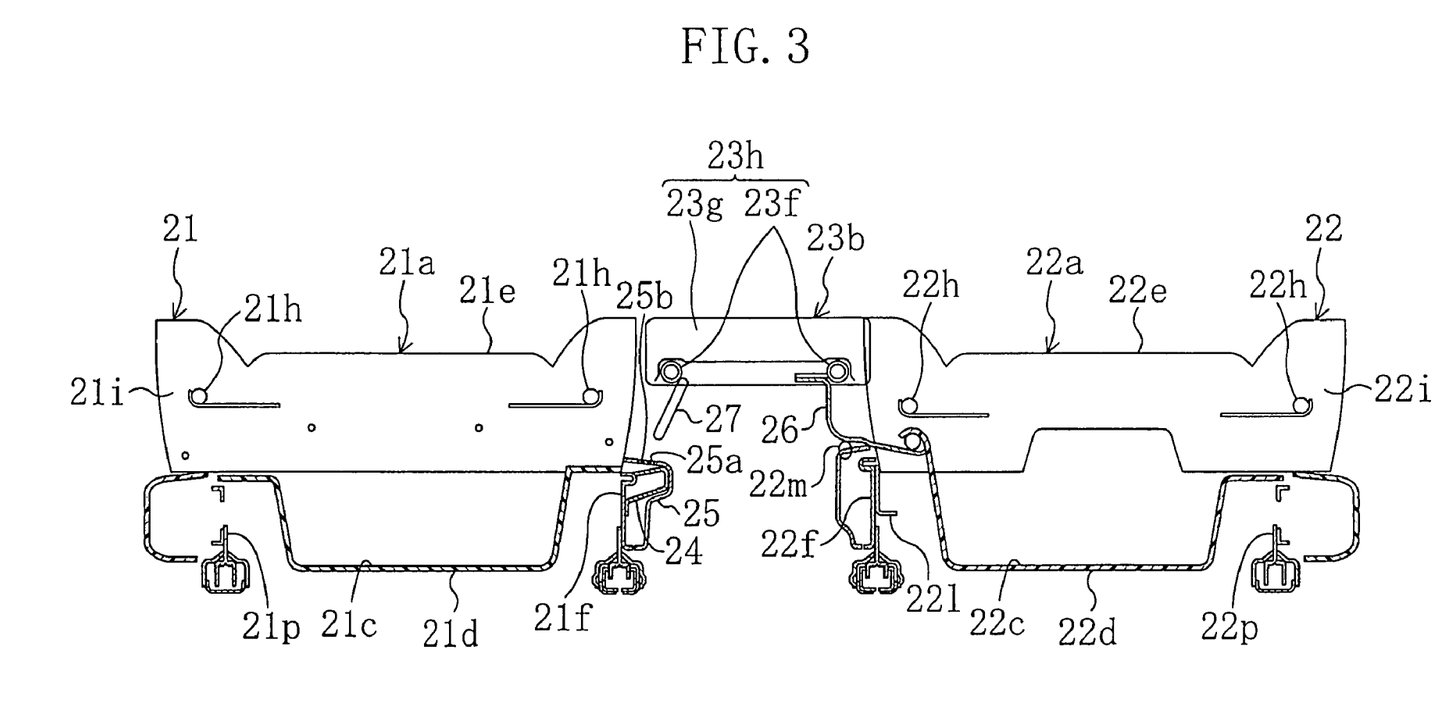
FIG. 3 is a cross-sectional view taken along the line A—A in FIG. 2 when an auxiliary seat is located in a use position.
Figure 4:
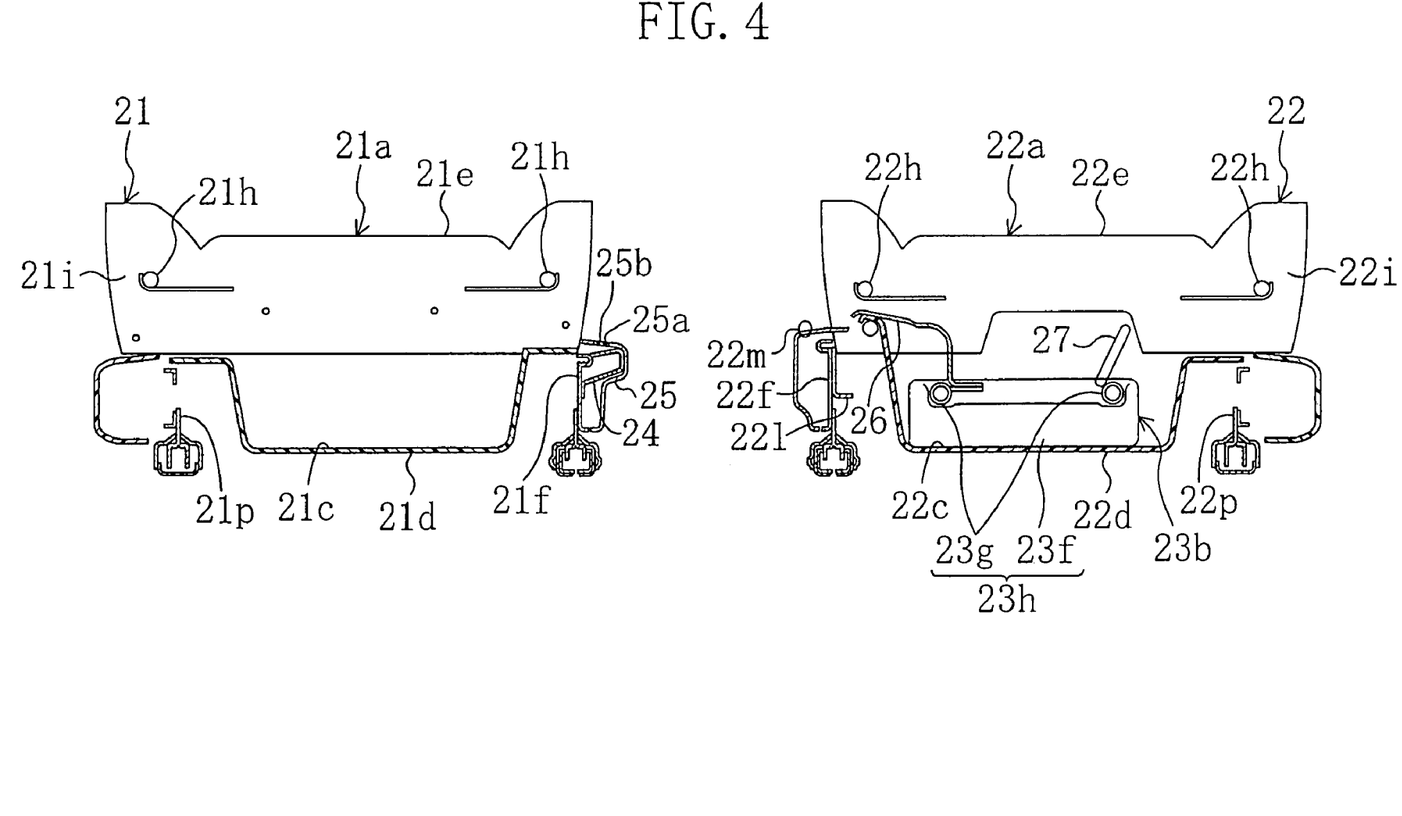
FIG. 4 is a cross-sectional view taken along the line A—A in FIG. 2 when the auxiliary seat is located in a non-use position.

A leftward jutting projection 24 is attached to the left side (the second independent side seat 22 side) of the sidewall frame member 21f located at the left side (the left side in the width direction of the automobile 1, i.e., the right side in FIGS. 2 through 4) of the first independent side seat 21 (see FIGS. 3 and 4). The projection 24 is formed to be generally U-shaped in lateral cross section and extends in the length direction of the automobile 1. The projection 24 is tilted upward from the end thereof attached to the sidewall frame member 21f toward the head, i.e., from the right side (the right side in the width direction of the automobile 1) toward the left side. In this embodiment, the left sidewall frame member 21f refers to the one sidewall frame. Further, the left side refers to the one side of the seat system, the right side refers to the other side thereof, and the projection 24 refers to restriction part.

A cover 25 is mounted to the left side of the first independent side seat 21 to cover the projection 24 and the like. A hole 25a (see FIGS. 3 and 4) is formed in the top of the cover 25 and is covered with a rubber element 25b.

Figure 5:
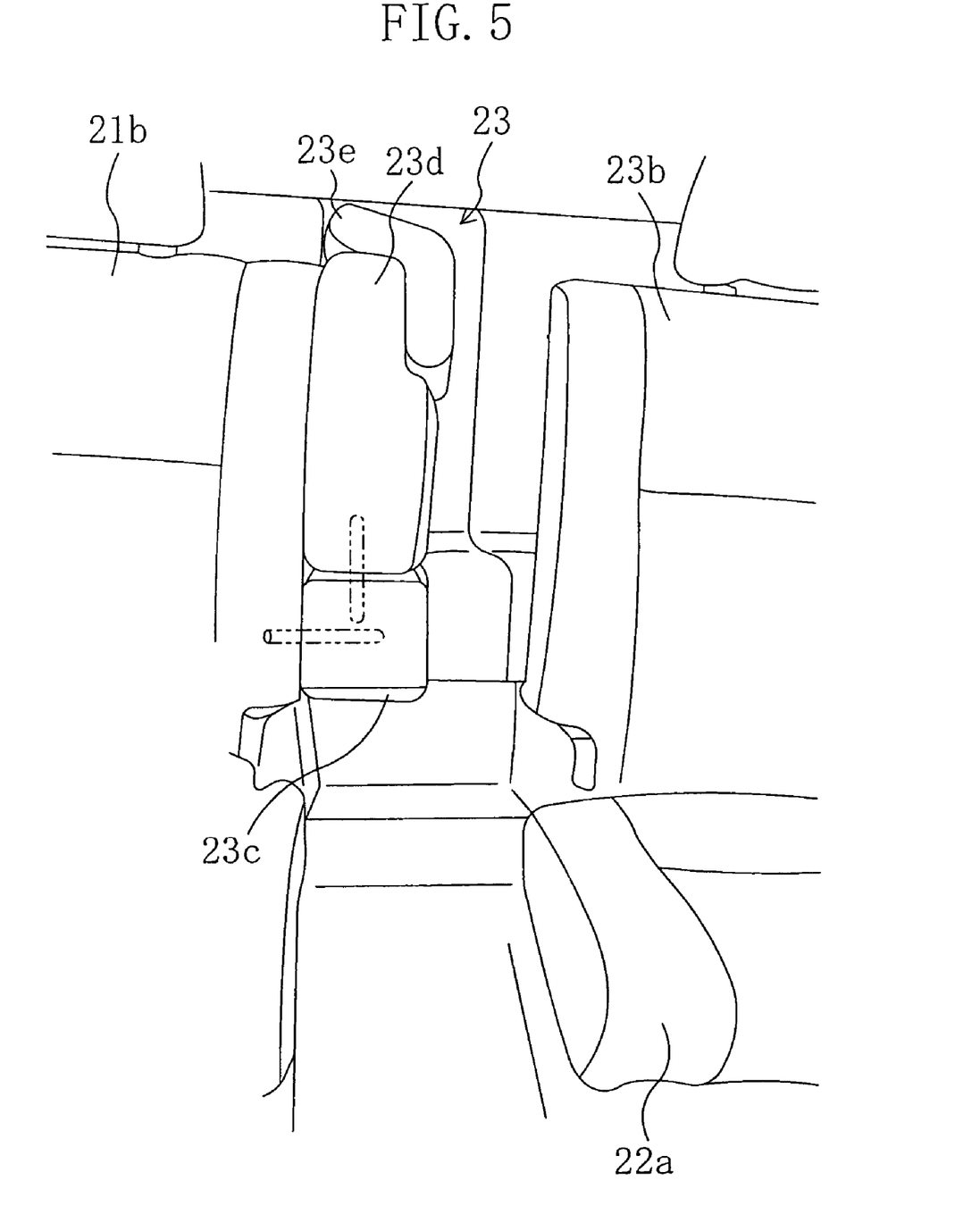
FIG. 5 is a front view of an auxiliary seat back for the auxiliary seat.

The auxiliary seat 23 comprises an auxiliary seat back 23a and an auxiliary seat cushion 23b provided separately from the auxiliary seat back 23a. As shown in FIG. 5, the auxiliary seat back 23a comprises a first seat back 23c pivoted about a shaft extending in the width direction of the automobile 1 at the lower left side of the seat back 21b of the first independent side seat 21, a second seat back 23d placed above the first seat back 23c and pivoted about a shaft extending perpendicularly to the width direction of the automobile 1 on the top of the first seat back 23c, and a third seat back 23e that can be used as a head rest. When the auxiliary seat 23 is not used, the space between the independent side seats 21 and 22 serves as a walk-through space. In this case, the auxiliary seat back 23a is made compact (see FIG. 5). In other cases, the first seat back 23c is rotated about the shaft extending in the width direction of the automobile 1 and the second seat back 23d is rotated about the shaft extending perpendicularly to the width direction of the automobile 1. This allows the auxiliary seat back 23a to serve as a seat back of the auxiliary seat 23 or serve as an arm rest.

As shown in FIGS. 2 through 4, the auxiliary seat cushion 23b comprises a cushion body 23h including a frame 23f and a cushion material 23g placed on the frame 23f, a hinge 26 for supporting the cushion body 23h rotatably about an axis extending in the length direction of the automobile 1, and a leg 27 mounted to the bottom of the cushion body 23h (the surface of the cushion body 23h opposite to the seating surface).

Figure 9:
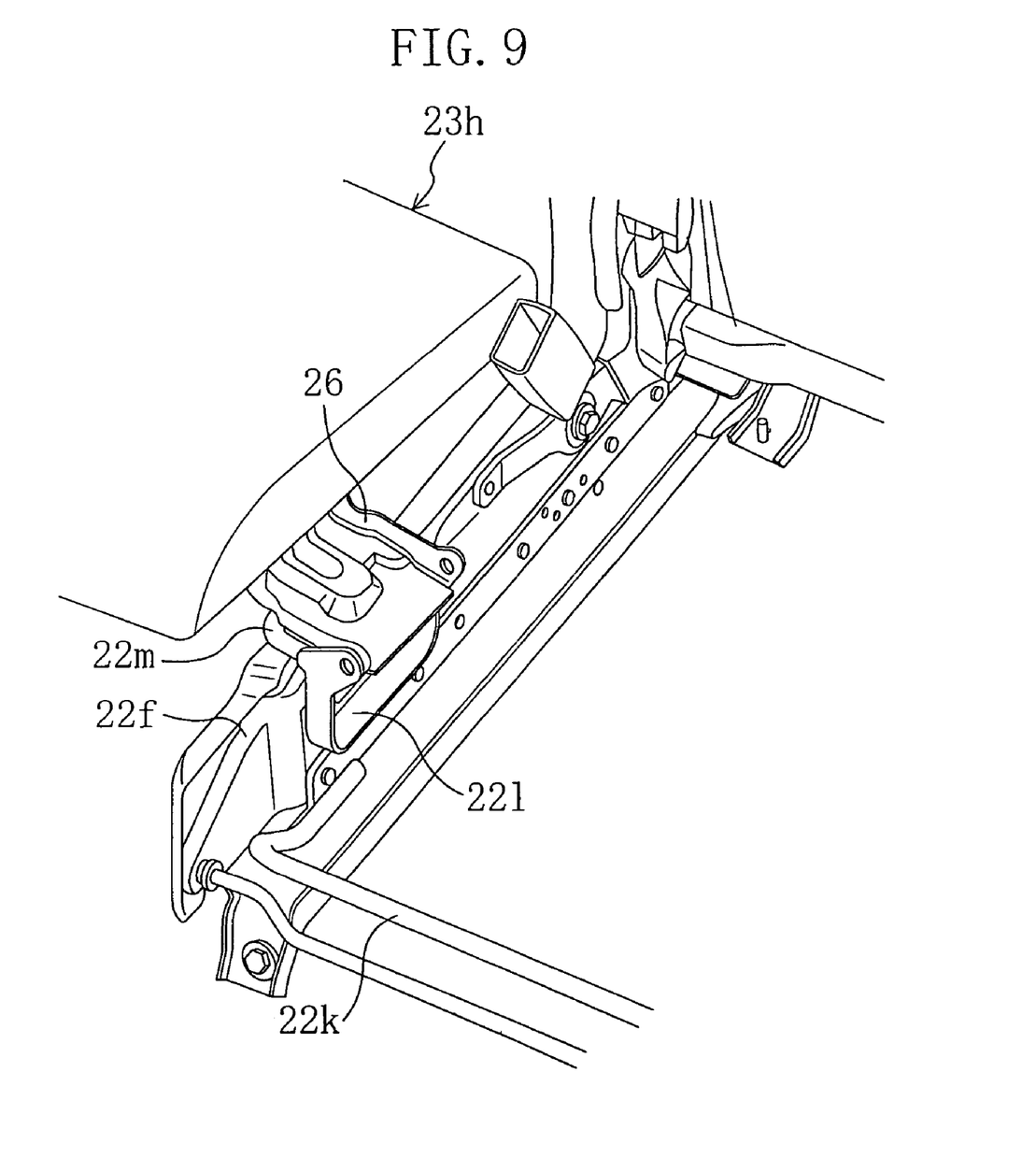
FIG. 9 is a perspective view showing the vicinity of the hinge.
Figure 10:
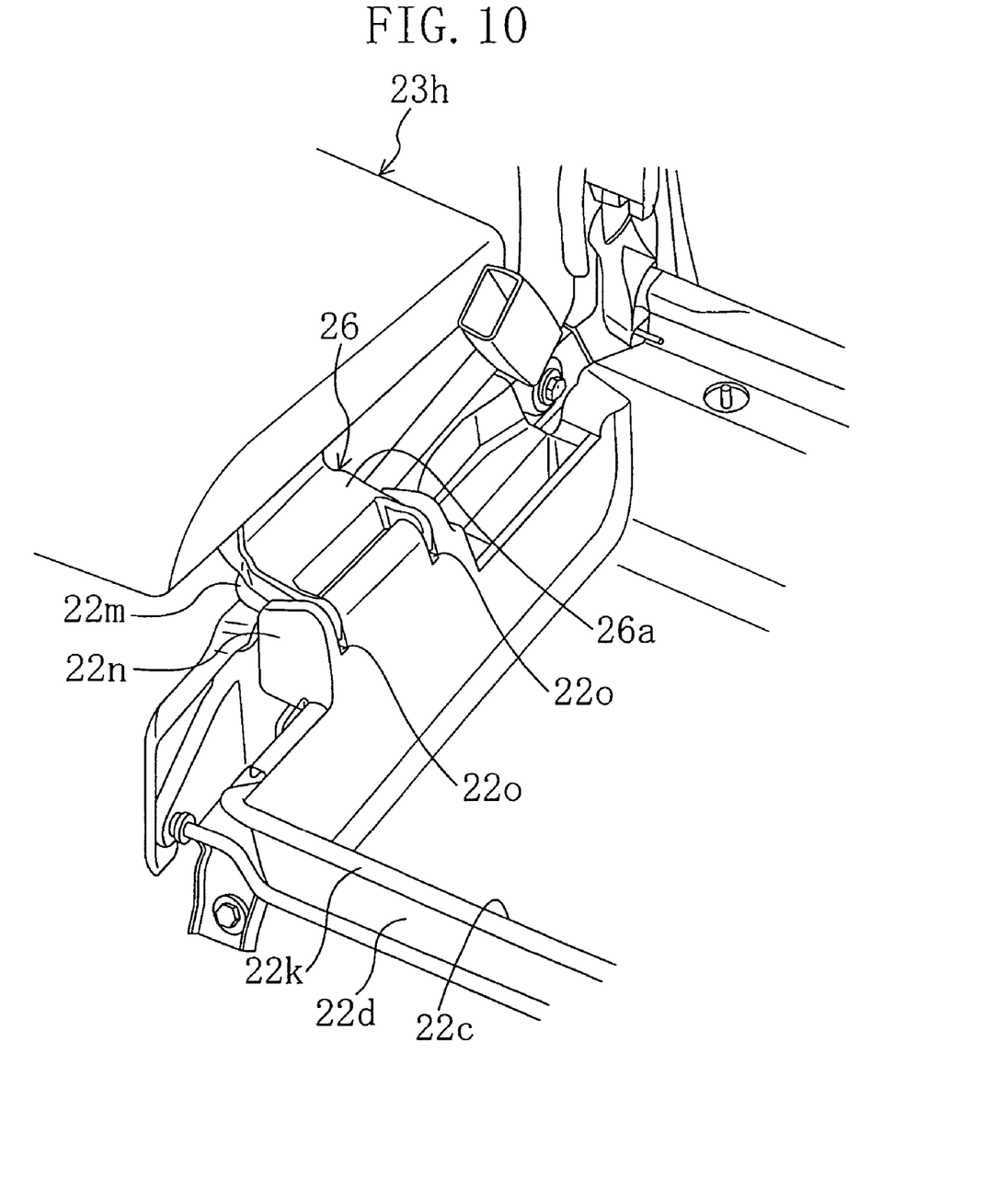
FIG. 10 is a perspective view showing the vicinity of the hinge.

One end portion (the upper end portion in FIGS. 2 and 3) of a hinge 26 is mounted via a plate-like member to the left portion of the frame 23f. The other end portion (the lower end portion in FIGS. 2 and 3) of the hinge 26 is pivoted about the axis extending in the length direction of the automobile 1 to a flange 221 joined to the left side of the right sidewall frame member 22f of the second independent side seat 22. In other words, the left portion of the cushion body 23h is connected and supported via the hinge 26 to a cushion base pivotably about the axis extending in the length direction of the automobile 1. To be specific, the front and rear ends of the other end portion of the hinge 26 are each pivotably connected and supported to the flange 221 by one hinge pin (not shown) extending in the length direction of the automobile 1 (see FIG. 9). Thus, the other end portion of the hinge 26 is rotated about the axis extending in the length direction of the automobile 1. In this way, the cushion body 23h (auxiliary seat cushion 23b) can be moved between a predetermined use position (see FIG. 3) located between the respective seat cushions 21a and 22a of the independent side seats 21 and 22, on which a passenger can be seated, and a predetermined non-use position (see FIG. 4) where, the cushion body 23h is accommodated in the storage recess 22c of the second independent side seat 22 and a passenger cannot be seated. While the hinge 26 is covered with a hinge cover 26a, the flange 221 is covered with a flange cover 22n (see FIG. 10). Two slits 22o, 22o are formed in the flange cover 22n to allow the other end portion of the hinge 26 to rotate about the axis extending in the length direction of the automobile 1.

Figure 8:
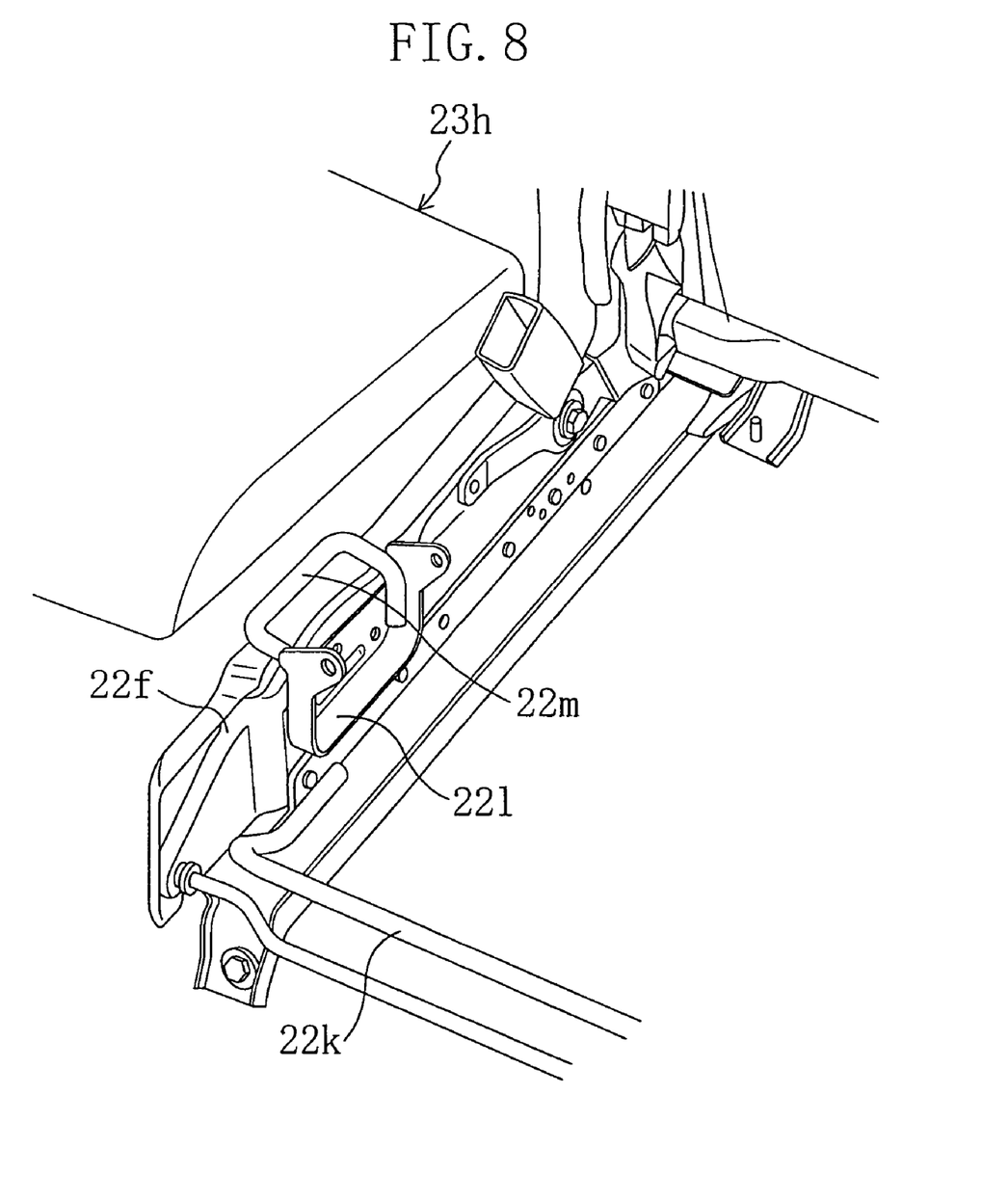
FIG. 8 is a perspective view showing the vicinity of a hinge.

The cushion body 23h in the non-use position directs its bottom upward (see FIG. 4). Furthermore, in order to keep the cushion body 23h in the use position, that is, in order to prevent the cushion body 23h in the use position from rotating to the right, a pipe 22m for use as a stopper is mounted to the flange 221 to project rightward beyond the right sidewall frame member 22f (see FIG. 8). The structure, mounting position and the like of the hinge 26 are determined to allow the cushion body 23h to move between the use position and the non-use position. In this embodiment, the use position refers to the use state, and the non-use position refers to the non-use state.

The leg 27 is formed to be U-shaped in side view and welded to the right portion of the frame 23f. The leg 27 of the cushion body 23h extends toward the top of the projection 24 when located in the use position. More specifically, the leg 27 in the use position extends toward the top of the projection 24 while being tilted to the right side from the end of the leg 27 welded to the frame 23f (the upper end in FIG. 3) toward the distal end thereof (the lower end in FIG. 3). Furthermore, the distal end of the leg 27 of the cushion body 23h is spaced a predetermined distance apart from the top of the projection 24 when located in the use position. The hole 25a of the above-mentioned cover 25 is formed in the position corresponding to the distal end of the leg 27 in the use position.

The seating surface of the cushion body 23h in the use position has the same vertical position as the seating surfaces of the seat cushions 21a and 22a of both the independent side seats 21 and 22. In addition, the cushion body 23h is thinner than the seat cushions 21a and 22a of both the independent side seats 21 and 22. The distal end of the leg 27 of the cushion body 23h in the non-use position (the upper end in FIG. 4) is located lower than the bottom of the cushion seating part 22e of the second independent side seat 22 in the closed position (the surface of the cushion seating part 22e opposite to the seating surface: the lower surface in FIG. 4).

Under normal conditions except when a large load is applied to the cushion body 23h of the auxiliary seat 23, the hinge 26, the pipe 22m and the like can support the seat cushion body 23h and a passenger is seated thereon without using the projection 24 and the leg 27. Under normal conditions, the distal end of the leg 27 does not make contact with the top of the projection 24 even when the passenger is seated on the auxiliary seat 23 in the use position.

Operation of Seat System

A description will be given of the process for moving the auxiliary seat 23 from the non-use position to the use position. First, the rear end of the cushion seating part 22e of the second independent side seat 22 is lifted. In this manner, the cushion seating part 22e rotates forward relative to the other ends of the supporting members 22g, 22g. As a result, the storage recess 22c of the second independent side seat 22 is exposed. Next, the cushion body 23h of the auxiliary seat cushion 23b housed in the storage recess 22c is lifted. In this manner, the cushion body 23h rotates to the right relative to the other end portion of the hinge 26. Then, the cushion body 23h is rotated to the use position, i.e., the position between the respective seat cushions 21a and 22a of both the independent side seats 21 and 22. As a result, the auxiliary seat 23 reaches the use position. When the auxiliary seat 23 in the seating position is to be retracted, the above-mentioned process steps will simply be reversed.

A description will be given of the movement of the auxiliary seat 23 when a large load is applied from the seating surface side of the auxiliary seat cushion 23b in the use position. In this case, the auxiliary seat cushion 23b is moved downward by this load. This leads to the downward displacement of the leg 27 provided in the bottom of the cushion body 23h. Thereafter, the leg 27 hits the rubber element 25b and then the top of the projection 24. Since the leg 27 hits the top of the projection 24 in this way, the right portion of the auxiliary seat cushion 23b is stopped (restricted) from moving downward.

Effects

As described above, in this embodiment, the seat cushion 21a of the first independent side seat 21 has a projection 24 for restricting the right portion of the auxiliary seat cushion 23b in the use position from being displaced downward. Therefore, the projection 24 can restrict the auxiliary seat cushion 23b from being displaced downward, for example, even on the application of a large load to the auxiliary seat cushion 23b. Hence, the auxiliary seat cushion 23b can be restricted from being displaced downward, for example, when a large load is applied to the auxiliary seat cushion 23b, without the provision of a long leg that reaches the floor of the automobile 1.

The projection 24 is provided on the left side of the left sidewall frame member 21f constituting a part of the seat cushion 21a of the first independent side seat 21. Therefore, the projection 24 can be embodied utilizing the first independent side seat 21.

The leg 27 is provided on the bottom of the auxiliary seat cushion 23b so as to extend toward the top of the projection 24 when the auxiliary seat cushion 23b is in the use position. More particularly, the leg 27 of the auxiliary seat cushion 23b in the use position extends toward the top of the projection 27 and does not reach the floor. Therefore, the leg 27 can be short. This does not cause the leg 27 to interfere with the accommodation of the auxiliary seat cushion 23b when the auxiliary seat cushion 23b is accommodated in the storage recess 22c.

The top of the projection 24 is spaced a predetermined distance apart from the distal end of the leg 27 of the auxiliary seat cushion 23b in the use position. Therefore, under normal conditions, the top of the projection 24 does not make contact with the distal end of the leg 27. Hence, under normal conditions, noises can be prevented from being produced due to the contact of the top of the projection 24 with the distal end of the leg 27.

The top of the projection 24 is spaced a predetermined distance apart from the distal end of the leg 27 of the auxiliary seat cushion 23b in use. Therefore, the leg 27 can be short.

The auxiliary seat cushion 23b is thinner than the seat cushions 21a and 22a of both the independent side seats 21 and 22. Therefore, the auxiliary seat cushion 23b can be made compact, leading to size reduction of the storage recess 22c for accommodating the auxiliary seat cushion 23b therein.

The distal end of the leg 27 of the auxiliary seat cushion 23b in the non-use position is located lower than the bottom of the cushion seating part 22e in the closed state. Therefore, when the auxiliary seat cushion 23b is accommodated in the storage recess 22c, the leg 27 does not need to be folded. Hence, the structure of the leg 27 and the structure of the auxiliary seat cushion 23b can be simplified.

The top of the projection 24 is tilted upward, from the right side to the left side. This ensures that the projection 24 restricts the auxiliary seat cushion 23b from being displaced downward as compared with the case where the projection 24 is tilted downward from the right side to the left side.

Although in this embodiment the auxiliary seat cushion 23b is accommodated in the storage recess 22c of the second independent side seat 22, the auxiliary seat cushion 23b may be accommodated in the storage recess 21c of the first independent side seat 21. In this case, the hinge 26 may be connected to the cushion base of the first independent side seat 21 rotatably about an axis extending in the length direction of the automobile 1. Further, the projection 24 may be mounted to the right side surface (the first independent side seat 21 side) of the right sidewall frame member 22f of the second independent side seat 22. Furthermore, the leg 27 may be welded to the left portion of the frame of the cushion body 23h.

Figure 6:
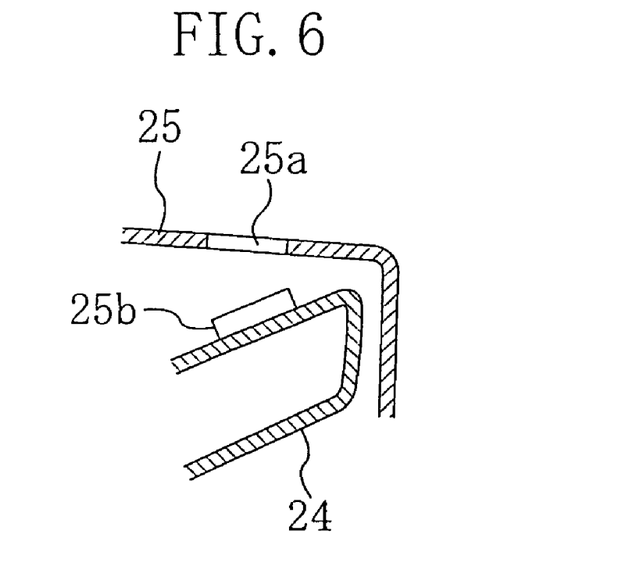
FIG. 6 shows a variant of a projection.
Figure 7:
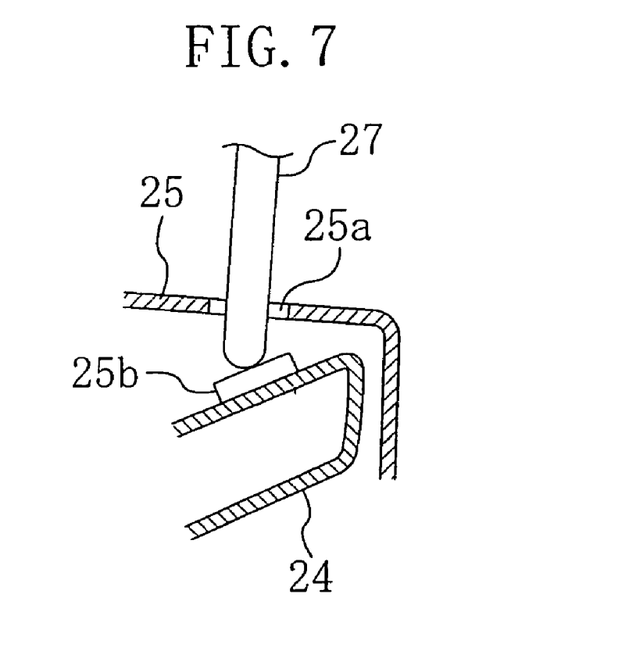
FIG. 7 is a view showing the case where a leg abuts against a rubber element of the projection.

In this embodiment, the hole 25a is formed in the top of the cover 25 and blocked by the rubber element 25b. However, as shown in FIG. 6, the rubber element 25b may be attached to a portion of the projection 24 corresponding to the hole 25a, instead of covering the hole 25a with a rubber element. FIG. 7 is a view showing the state where the leg 27 abuts against a rubber element 25b of the projection 24 when the rubber element 25b is attached to the portion of the projection 24 corresponding to the hole 25a.

Although in this embodiment the restriction part of the present invention is constituted by the projection 24, the restriction part may have any structure as long as it restricts the right portion of the auxiliary seat cushion 23b in the use position from being displaced downward.

INDUSTRIAL APPLICABILITY

As described above, the present invention is of usefulness in the structure of the seat system comprising two independent seats each having a seat cushion and aligned at a distance from each other in the lateral direction of the seats, and an auxiliary seat having an auxiliary seat cushion switchable between the seatable, use state where the auxiliary seat cushion is located between the independent seats and the non-use state, wherein the auxiliary seat cushion is supported by the seat cushion of one of the two independent seats located at one side.

Although the present invention has been described in relation to particular embodiment thereof, many other variations and modifications and other uses will become apparent to those skilled in the art. It is preferred, therefore, that the present invention be limited not by the specific disclosure therein, but only the appended claims.

What is claimed is:

1. A seat system comprising:
   first and second independent seats each having a seat cushion and located at one side of the seat system and at the other side of the seat system, respectively, so as to be spaced apart from each other in the lateral direction of the seats; and
   an auxiliary seat having an auxiliary seat cushion switchable between a use state where the auxiliary seat is located between the independent seats to allow a passenger to be seated thereon and a non-use state, the auxiliary seat cushion being supported by the seat cushion of the second independent seat,
   wherein,
   the seat cushion of the second independent seat comprises a cushion base in which an upwardly opened recess is formed and a cushion seating part covering the recess so as to be freely opened and closed;
   the second independent seat side portion of the auxiliary seat cushion is connected to and supported by the cushion base of the second independent seat to be rotatable about an axis extending in a lengthwise direction of an automobile, thereby accommodating the auxiliary seat cushion in the non-use state in the recess of the second independent seat with the bottom of the auxiliary seat cushion directed upward;
   the seat cushion of the first independent seat has a projection located below the bottom of the auxiliary seat cushion in the use state and projecting toward the second independent seat side, the projection for restricting the first independent seat side portion of the auxiliary seat cushion in the use state from being displaced downward;
   a leg is provided on the bottom of the auxiliary seat cushion so as to extend toward the top of the projection when the auxiliary seat cushion is in the use state;
   the distal end of the leg of the auxiliary seat cushion in the non-use state is located lower than the bottom of the cushion seating part of the second independent seat in the closed state; and
   the top of the projection and the distal end of the leg of the auxiliary seat cushion in the use state have a predetermined distance therebetween and do not come in contact with each other when the passenger is seated on the auxiliary seat in the use state, but come in contact with each other when a load, larger than a load applied when the passenger is seated on the auxiliary seat in the use state, is applied from a seating surface side of the auxiliary seat cushion in the use state.

2. The seat system of claim 1, wherein:
   the seat cushion of the first independent seat has frame members at least on the right and left sides; and
   projection is provided on one of the frame members, the frame member being located at the second independent seat side.

3. The seat system of claim 2, wherein:
   the top of the projection is tilted upward toward the second independent seat side.

4. The seat system of claim 1, wherein:
   the seating surface of the auxiliary seat cushion in the use state is located at the same level as the seating surfaces of the seat cushions of the independent seats, and
   the auxiliary seat cushion is thinner than the seat cushions of the independent seats.

5. The seat system of claim 1, wherein:
   the cushion seat part of the second independent seat is connected to and supported by a front end part of the cushion base of the second independent seat to be rotatable about an axis extending in a widthwise direction of the automobile, thereby covering the recess of the second independent seat to be freely opened and closed.

6. A seat system comprising: first and second independent seats each having a seat cushion and located at one side of the seat system and at the other side of the seat system, respectively, so as to be spaced apart from each other in the lateral direction of the seats; and
   an auxiliary seat having an auxiliary seat cushion switchable between a use state where the auxiliary seat is located between the independent seats to allow a passenger to be seated thereon and a non-use state, the auxiliary seat cushion being supported by the seat cushion of the second independent seat,
   wherein;
   the seat cushion of the first independent seat has a projection located below the bottom of the auxiliary seat cushion in the use state and projecting toward the second independent seat side, the projection for restricting the first independent seat side portion of the auxiliary seat cushion in the use state from being displaced downward;
   a leg is provided on the bottom of the auxiliary seat cushion so as to extend toward the top of the projection when the auxiliary seat cushion is in the use state; and
   the top of the projection and the distal end of the leg of the auxiliary seat cushion in the use state have a predetermined distance therebetween and do not come in contact with each other when the passenger is seated on the auxiliary seat in the use state, but come in contact with each other when a load, larger than a load applied when the passenger is seated on the auxiliary seat in the use state, is applied on a seating surface side of the auxiliary seat cushion in the use state.

* * * * *